United States Patent [19]

Fuller

[11] 4,184,478
[45] Jan. 22, 1980

[54] HEAT EXCHANGERS AND SOLAR HEATING

[75] Inventor: Dean L. Fuller, Greytown, New Zealand

[73] Assignee: Solar Products Limited, Greytown, New Zealand

[21] Appl. No.: 853,815

[22] Filed: Nov. 21, 1977

[30] Foreign Application Priority Data

Nov. 22, 1976 [NZ] New Zealand .......................... 182676

[51] Int. Cl.² ................................................ F24J 3/02
[52] U.S. Cl. ..................................... 126/434; 126/443
[58] Field of Search .............................. 126/270, 271

[56] References Cited

U.S. PATENT DOCUMENTS

| | | | |
|---|---|---|---|
| 705,167 | 7/1902 | Walker ................................ | 126/271 |
| 2,213,894 | 9/1940 | Barry .................................. | 126/271 |
| 4,026,273 | 5/1977 | Parker ................................ | 126/271 |
| 4,059,093 | 11/1977 | Knowles et al. .................... | 126/271 |
| 4,078,549 | 3/1978 | McKeen et al. .................... | 126/271 |

Primary Examiner—Peter M. Caun
Attorney, Agent, or Firm—Holman & Stern

[57] ABSTRACT

The invention particularly relates to a heat exchanger and a solar heating unit incorporating the heat exchanger, said heat exchanger being constructed with an outer tubular member closed at its ends and provided with a fluid inlet at one end and a fluid outlet at the other end, and an inner tubular member of different cross-sectional shape to the cross-sectional shape of the outer tubular member but positioned and dimensioned so as to provide a plurality of longitudinal points of contact between the outer member inner surface and the inner member outer surface and a plurality of fluid ducts defined by the longitudinal wall portions of the outer and inner tubular members between said points of contact.

9 Claims, 6 Drawing Figures

HEAT EXCHANGERS AND SOLAR HEATING

This invention relates to heat exchangers and solar heating and more particularly relates to the construction of fluid containers and the manner in which fluid ducts may be formed within such containers in the provision of heat exchange units which have particular application for the heating of water by solar heat.

An object of this invention is to provide a simple but effective means for providing a heat exchanger and fluid duct system therein whereby such exchanger can be manufactured and sold at relatively low cost whilst at the same time the heat exchanger provides broad areas of contact for fluid within the ducts formed to thus provide a means for efficient heat exchange between the heat exchanger and the fluid passed therethrough.

Other and more particular objects and advantages of the invention will become apparent from the ensuing description.

According to the first aspect of this invention therefore, there is provided a heat exchanger comprising an outer tubular member closed at its ends and provided with a fluid inlet at one end and a fluid outlet at the other end, and an inner tubular member of different cross-sectional shape to the cross-sectional shape of the outer tubular member but positioned and dimensioned so as to provide a plurality of longitudinal points of contact between the outer member inner surface and the inner member outer surface and a plurality of fluid ducts defined by the longitudinal wall portions of the outer and inner members between said points of contact.

Preferred aspects of this invention will now be described by way of example with reference to a solar water heating system and with reference to the accompanying drawings, in which.

Figure 1:
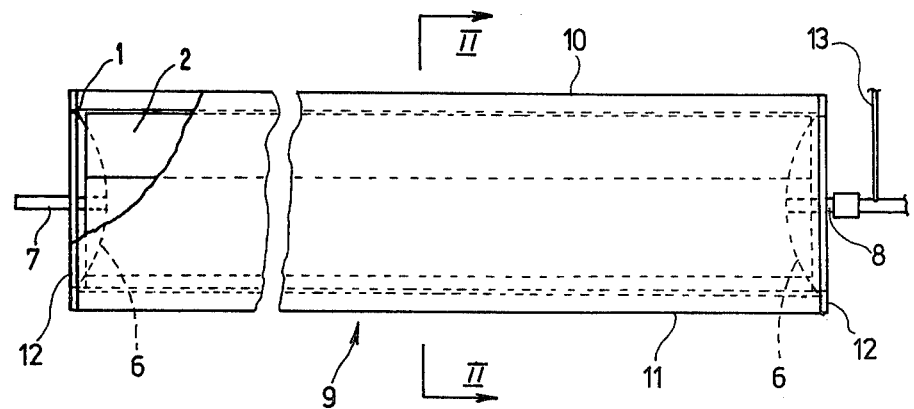
FIG. 1 is a side elevational view of one form of solar water heating unit in accordance with the invention.

In this first preferred form of invention, and one of the simplest forms, the outer member 1 of the heat exchanger is of cylindrical tube formation and may be formed from such as a black plastics material but is preferably of a more permanent and heat conducting material such as copper or an aluminium alloy. The inner tubular member 2 may be of any polygonal cross-section i.e. any multi-sided tubular figure and preferably a regular sided figure, the illustrated example shows a pentagonal cross-sectional inner member 2, and is formed so as to be a tight fit within the outer member 1 at the longitudinal corners 3 of the inner member 2.

By providing a tight fitting construction it will normally be unnecessary to in fact secure the outer and inner tube members 1 and 2 together by welding or the like, but such securement can take place if preferred or if considered desirable for certain uses of the invention, such as where it may be necessary or desirable for the fluid ducts 4 formed between the two members 1 and 2 and the points of contact 3 to be sealed from each other. The preferred non-welded friction fit arrangement of the outer and inner tubular members 1 and 2 has an added advantage of permitting expansion and contraction of the members 1 and 2 under temperature variation and without either of the members 1 and 2 being placed under undue stress likely to cause joint failure.

In the present preferred application of the invention to solar water heating, the provided unit is intended to work on a thermo-siphon convection system for water contained within the outer and inner tubular members 1 and 2, with the main body of water being accommodated within the area 5 defined by the inner member 2. The inner member 2 can either terminate short of the ends 6 of the outer member 1 to provide communication between the ducts 4 and the main inner area 5, or the inner member 2 can extend to the ends of the outer member 1 and communication can be provided between ducts 4 and main inner area 5 by means of apertures or ports 2a provided at or near the ends of the wall parts of the inner tubular member 2.

The end walls 6 of the container (in particular the end walls 6 of the outer tubular member 1) thus formed may be concave or dished inwardly for added strength, and an inlet pipe 7 may be secured medially and co-axially of one end and an outlet pipe 8 secured medially and co-axially at the other end for water or other fluid to be passed through the unit.

In the solar heating application, the heat exchanger unit thus formed is preferably arranged to be housed within a housing 9 comprising a transparent or translucent cover such as an arcuate or inverted U-shaped cover 10 secured at its lower ends to a base member 11, which may be a metal base of shallow trough form, and is preferably provided at least on its upper inner side 11a with a reflective surface whereby the sun's rays entering the housing 9 may be reflected back from such reflective inner side 11a on to the underside of the heat exchanger unit. The housing 9 may include transparent or translucent end wall members 12, but for added strength and to provide support for the heat exchanger unit located there within, the end plates 12 of the housing 9 can be again of metal with preferably reflective surfaces on at least the inner sides. The inlet and outlet pipes 7 and 8 may pass through such end plates 12 in providing support and an expansion pipe 13 may extend from the outlet pipe 8 of the unit or from a pipe connection thereto.

In a preferred construction of the invention, in addition to the main housing 9 the heat exchanger unit is mounted within an outer transparent tubular cover member 14 which is of a heat retaining but sun's ray or heat admitting material e.g. a polycarbonate plastics or clear fibre-glass cover 14, there being a small airspace between the outer cover 14 and the outer tubular member 1 of the heat exchanger. Where the heat exchanger outer member 1 is cylindrical, then of course the surrounding cover 14 will be similarly cylindrical but of a slightly larger diameter.

Figure 2A:
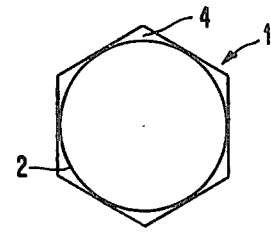
FIG. 2a is a cross-sectional view of a modification of the heat exchanger.

It will be appreciated that the invention is not confined to a heat exchanger having a cylindrical outer member 1 and a pentagonal cross-section inner member 2, but that the outer member 1 can be, for example, be elliptical in cross-section (with the surrounding cover where provided also similarly of elliptical cross-section) or that the inner member 2 may be of square, hexagonal, octagonal or any other multi-sided cross-sectional shape—the number of sides may be determined by the actual diameter required for the heat exchanger, the capacity of the exchanger and/or the desired effective peripheral surface areas of the formed ducts 4. In another variation of the invention, it is envisaged that the inner member 2 can be cylindrical and the outer member 1 can be multisided or of regular polygonal cross-section with the dimensions of both inner and outer members 2 and 1 appropriately designed so that longitudinal parts of the outer peripheral surface of the inner cylindrical member 2 can be in longitudinal contact with medial longitudinal parts of the flat walls of the outer member (as exampled in FIG. 2a).

Figure 5:
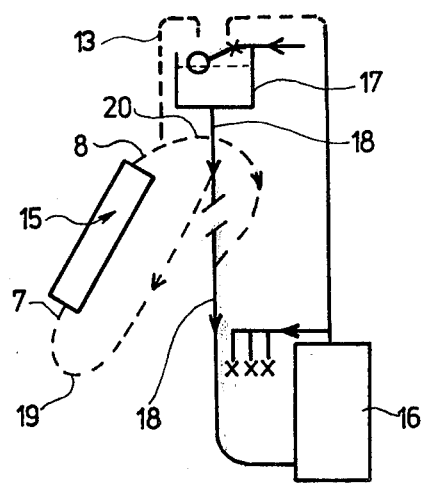
FIG. 5 is a diagrammatic view illustrating the location of a solar heating unit in accordance with the invention and incorporated in a domestic water heating system.
Figure 2:
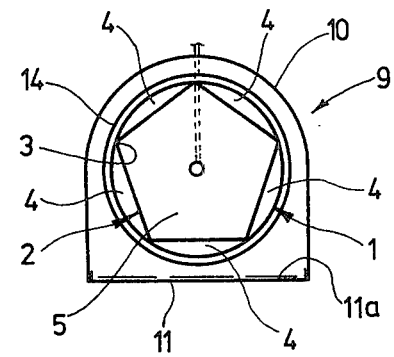
FIG. 2 is a cross-sectional view on line II—II of FIG. 1.
Figure 4:
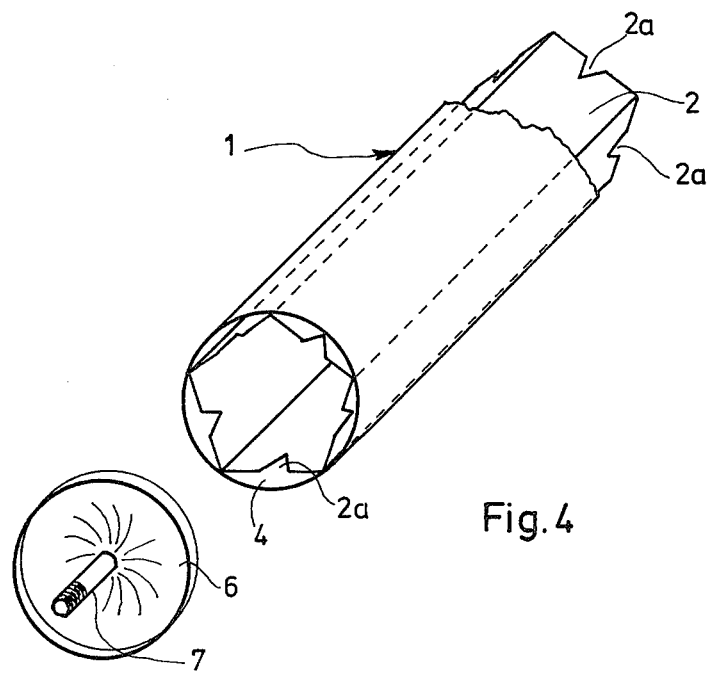
FIG. 4 is a fragmentary view more particularly showing one construction of the inner tubular member of the heat exchanger.
Figure 3:
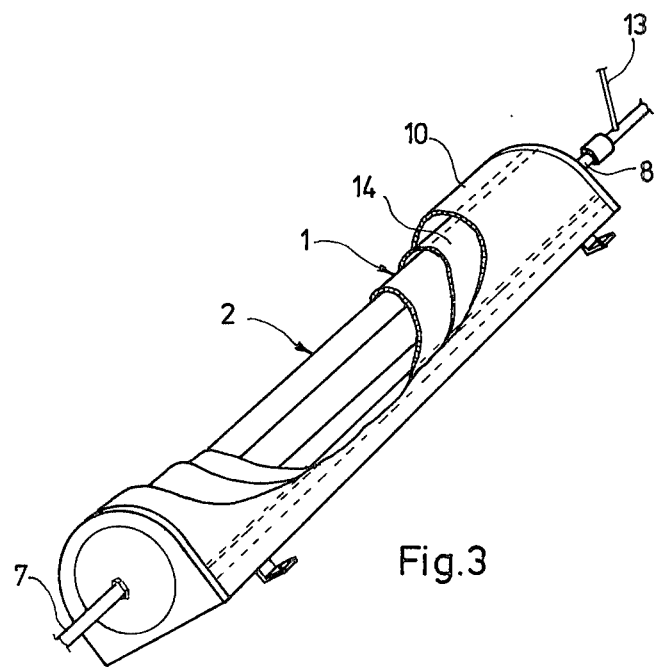
FIG. 3 is a part broken perspective view of an assembled solar water heating unit.

The preferred solar heating unit and incorporated heat exchanger of this invention is arranged, as before mentioned, for thermo-syphonic circulation of water and as a storage unit for heater water and water to be heated by solar rays, and is therefor arranged for disposition in an inclined or vertical plane for efficiency of operation. The arrangement provides a self-contained unit which may be readily incorporated in a new or existing domestic hot water system, and FIG. 5 of the accompanying drawings illustrates diagrammatically the location of a solar heating unit, generally indicated at 15, in an existing conventional system comprising an electric hot water storage cylinder 16 and cold water heater tank 17, the main cold water feed pipe 18 from tank 17 to cylinder 16 being severed at an intermediate point and new pipes 19 and 20 being provided to couple to the solar heating unit inlet pipe 7 to the cold water pipe 18 leading from the tank 17 and couple the solar heating unit outlet pipe 8 to the section of pipe 18 leading to the hot water cylinder 16.

The illustrated and described solar water heating unit is a single unit and it will be appreciated that multiples of such units can be coupled in series or in parallel as may be required.

Particular embodiments of the invention have been described and illustrated by way of example but it will be appreciated that other variations of and modifications to such embodiments can take place without departing from the scope of the appended claims.

I claim:

1. A heat exchanger and fluid storage unit comprising an outer tubular heat absorbent member closed at its ends and provided with a fluid inlet at one end and a fluid outlet at the other end, and an inner tubular member of different cross-sectional shape to the cross-sectional shape of the outer tubular member, said inner tubular member being positioned within said outer tubular member and having a tubular peripheral wall defining an interior fluid compartment, said tubular peripheral wall having an outer surface defining a plurality of longitudinal lines of contact with the inner surface of the outer member to form a plurality of longitudinal fluid ducts between the outer and inner members between said lines of contact, said ducts having opposite end parts in communication with the interior compartment of the inner tubular member for circulation of the fluid within the unit, and said interior compartment being dimensioned relative to said outer member to accommodate the main volume of fluid passed into and out of the unit.

2. A heat exchanger as claimed in claim 1 wherein the outer tubular member is cylindrical in form and the inner tubular member is of regular polygonal cross-section.

3. A heat exchanger as claimed in claim 1 wherein the inner tubular member is a friction fit within the outer tubular member.

4. A heat exchanger as claimed in claim 1 wherein the inner tubular member is of cylindrical form and the outer tubular member is of regular polygonal cross-section.

5. A heat exchanger as claimed in claim 1 wherein the inner tubular member terminates short of the ends of the outer tubular member in providing communication between the longitudinal fluid ducts and the inner area defined by the inner tubular member.

6. A heat exchanger as claimed in claim 1 wherein the inner tubular member extends for the full length of the outer tubular member between the ends thereof, and fluid ports or apertures are provided at or near the ends of the wall portion of the inner tubular member to provide communication between the longitudinal fluid ducts and the inner area defined by the inner tubular member.

7. A solar water heater comprising the heat exchanger of claim 1 with its outer tubular member formed as or provided with a solar heat absorbtion outer surface and being located within a further outer tubular member of transparent material capable of admitting solar heat rays and defining a sealed air space about said outer tubular member of the heat exchanger.

8. A solar water heater as claimed in claim 7 wherein an outer housing having at least a major part of transparent or translucent material is provided to enclose said heater.

9. A solar water heater as claimed in claim 8 wherein the housing has a base part with a reflective inner surface arranged to reflect solar rays onto the heat exchanger.

* * * * *